US010437916B2

(12) United States Patent
Boegelund et al.

(10) Patent No.: US 10,437,916 B2
(45) Date of Patent: *Oct. 8, 2019

(54) CASCADING MENUS FOR REMOTE POPPING (71) Applicant: INTERNATIONAL BUSINESS MACHINES CORPORATION, Armonk, NY (US)

(72) Inventors: Flemming Boegelund, Frederikssund (DK); Steven E Hicks, Coppell, TX (US); Anders Westberg, Stockholm (SE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 845 days.

This patent is subject to a terminal disclaimer.

(21) Appl. No.: 14/735,698

(22) Filed: Jun. 10, 2015

(65) Prior Publication Data
US 2015/0278170 A1    Oct. 1, 2015

Related U.S. Application Data (63) Continuation of application No. 12/366,702, filed on Feb. 6, 2009, now Pat. No. 9,086,781.

(51) Int. Cl.
G06F 17/00 (2019.01)
G06F 17/22 (2006.01)
(Continued)

(52) U.S. Cl.
CPC ........ G06F 17/2235 (2013.01); G06F 3/0482 (2013.01); G06F 17/2247 (2013.01);
(Continued)

(58) Field of Classification Search
CPC ............ G06F 17/30899; G06F 3/0482; G06F 17/2235
See application file for complete search history.

(56) References Cited

U.S. PATENT DOCUMENTS 5,345,550 A   9/1994 Bloomfield
5,742,768 A   4/1998 Gennaro
(Continued)

OTHER PUBLICATIONS

Stu Nicholls, "CSS Play, Experiments With Cascading Stye Sheets", Accessed Online at http://www.cssplay.co.uk/menus/index.html as of Dec. 23, 2008, 5 pages.
(Continued)

Primary Examiner — Andrew T McIntosh
(74) Attorney, Agent, or Firm — Isaac Gooshaw; Amy J. Pattillo (57) ABSTRACT A pop reader of a browser searches HTML code for a webpage with a plurality of links for a first link specified with a first target file name comprising a pop type element. The pop reader, responsive to detecting the first link specified with the first target file name comprising the pop type element, inserts a first command into the HTML code to disable the first link and set an event to pop up a first menu layer of a plurality of layers of a cascading menu and inserts a second command to specify the content of the first menu layer from a file accessed for the first target file name. The browser, responsive to detecting the event, displays the first menu layer with the specified content by the second command within the interface displaying the webpage.

15 Claims, 5 Drawing Sheets (51) Int. Cl.
*G06F 3/0482* (2013.01)
*H04L 29/08* (2006.01)
*G06F 3/0481* (2013.01)
*G06F 3/0484* (2013.01)

(52) U.S. Cl.
CPC .......... *H04L 67/02* (2013.01); *G06F 3/0481* (2013.01); *G06F 3/0484* (2013.01); *G06F 3/04817* (2013.01)

(56) References Cited

U.S. PATENT DOCUMENTS

| | | | |
|---|---|---|---|
| 5,761,683 A | 6/1998 | Logan et al. | |
| 5,805,167 A | 9/1998 | Cruyningen | |
| 6,002,402 A | 12/1999 | Schacher | |
| 6,373,502 B1* | 4/2002 | Nielsen | G06F 17/30896 707/E17.118 |
| 6,578,201 B1 | 6/2003 | LaRocca et al. | |
| 6,658,419 B2 | 12/2003 | Pasquali | |
| 6,662,365 B1 | 12/2003 | Sullivan et al. | |
| 6,769,010 B1 | 7/2004 | Knapp | |
| 6,973,625 B1 | 12/2005 | Lupo | |
| 7,032,183 B2 | 4/2006 | Durham | |
| 7,058,944 B1 | 6/2006 | Sponheim et al. | |
| 7,240,323 B1 | 7/2007 | Desai et al. | |
| 7,562,287 B1 | 7/2009 | Goldstein et al. | |
| 7,975,019 B1* | 7/2011 | Green | G06Q 30/0241 705/14.4 |
| 8,150,716 B1 | 4/2012 | Lunsford et al. | |
| 8,341,529 B1 | 12/2012 | Li et al. | |
| 8,387,006 B1 | 2/2013 | Taylor | |
| 2002/0010798 A1 | 1/2002 | Ben-Shaul et al. | |
| 2002/0012010 A1 | 1/2002 | Pasquali | |
| 2002/0054161 A1 | 5/2002 | Durham | |
| 2003/0137531 A1 | 7/2003 | Katinsky | |
| 2003/0146939 A1 | 8/2003 | Petropoulos et al. | |
| 2003/0149737 A1 | 8/2003 | Lambert et al. | |
| 2004/0133472 A1 | 7/2004 | Leason et al. | |
| 2004/0148307 A1 | 7/2004 | Rempell | |
| 2005/0022128 A1 | 1/2005 | Nicholas et al. | |
| 2005/0251856 A1 | 11/2005 | Araujo et al. | |
| 2005/0273762 A1* | 12/2005 | Lesh | G06F 3/0482 717/115 |
| 2006/0015821 A1 | 1/2006 | Parker et al. | |
| 2006/0031404 A1* | 2/2006 | Kassab | G06F 17/30893 709/218 |
| 2006/0101334 A1 | 5/2006 | Liao et al. | |
| 2007/0028185 A1 | 2/2007 | Bhogal et al. | |
| 2007/0073833 A1 | 3/2007 | Roy et al. | |
| 2007/0074125 A1 | 3/2007 | Platt et al. | |
| 2007/0078810 A1 | 4/2007 | Hackworth | |
| 2007/0192734 A1* | 8/2007 | Berstis | G06F 3/0481 715/808 |
| 2007/0220447 A1 | 9/2007 | Ray | |
| 2008/0134093 A1 | 6/2008 | Dharmarajan et al. | |
| 2008/0140626 A1 | 6/2008 | Wilson | |
| 2009/0077565 A1 | 3/2009 | Frazier | |
| 2010/0205547 A1 | 8/2010 | Green et al. | |

OTHER PUBLICATIONS

"Firefox Add-ons: Common Plugins for Firefox", copyright 2005-2007, Mozilla, accessed online <https://addons.mozilla.org/en-US/firefox/browse/type:7> archived on wayback.com on May 14, 2014, 2 pages.

"Popup Menu Plugin", copyright 2002, Icy North Technologies, accessed online <http://www.icynorth.com/popupmenuplugin/index.html> archived on wayback.com on May 14, 2014, 2 pages.

Stu Nicholls, "CSS Play, experiments with Cascading Style Sheets", copyright 2004/2005, accessed online <http://www.cssplay.co.uk/menus/index.html> archived on wayback.com on May 14, 2014, 1 page.

Notice of Allowance, dated Apr. 28, 2014, U.S. Appl. No. 12/366,702, filed Feb. 6, 2009, In re Boegelund, 15 pages.

Notice of Allowance, dated Mar. 13, 2015, U.S. Appl. No. 12/366,702, filed Feb. 6, 2009, In re Boegelund, 19 pages.

Final Office Action, dated Nov. 7, 2012, U.S. Appl. No. 12/366,702, filed Feb. 6, 2009, In re Boegelund, 150 pages.

VK, "disable all href/links when user clicks a link", Jul. 20, 2005, accessed online from <http://bytes.com/topic/javascript/answers/91268-disable-all-hreflinks-when-user-click-link#post305535>, Post #4, 5 pages.

Mitko Gerensky-Greene, "Search Engine Optimization DHML Menu Case Study", Published by Aug. 22, 2003, accessed online from <http://web.archive.org/web/20030822201709/http://www.milonic.com/casestudy.php>, 6 pages.

Microsoft Corporation, Web Application with Microsoft® Visual InterDev® 6.0 MCSD Training Kit, Jan. 12, 2000, accessed online from <http://www.microsoft.com/mspress/books/sampchap/4225a.aspx>, Chapter 3, 10 pages.

Justin Bezanson, CSS3 Menu Beautiful Drop Down Menus with Pure CSS!, Oct. 27, 2008, accessed online from <http://www.dev102.com/2008/1 0/27/spice-up-your-navigation-with-css-drop-down-menus/>, 11 pages.

John Resig, DOM insertAdjacentHTML, Nov. 24, 2008, accessed online from <http://ejohn.org/blog/dom-insertadjacenthtml/>, 3 pages.

Microsoft, insertAdjacentHTML Method, Date Unknown but Document is for Office 2003, accessed online from <http://msdn.microsoft.com/enus/library/office/aa 170709> as of Oct. 23, 2012, 2 pages.

Office Action, dated Mar. 24, 2011, U.S. Appl. No. 12/366,702, filed Feb. 6, 2009, In re Boegelund, 13 pages.

Office Action, dated Sep. 16, 2013, U.S. Appl. No. 12/366,702, filed Feb. 6, 2009, In re Boegelund, 87 pages.

Stackoverflow, "CSS/Javascript Use Div to grey out section of page", Available online by Dec. 31, 2008 from< http://stackoverflow.com/questions/159914/css-javascript-use-div-to-grey-out-section-of-page (http://web.archive.org/web/20081231155821 lhttp://stackoverflow.com/questions/159914/css-javascript-use-divto-grey-out -section-of -page)>, 4 pages.

CSSCreator, "Disable links using a Div?", Apr. 2006, accessed online from <http://csscreator.com/node/15510#comment-68655>, 3 pages.

Office Action, dated Sep. 19, 2011, U.S. Appl. No. 12/366,702, filed Feb. 6, 2009, In re Boegelund, 37 pages.

"Disable/Enable Links on a Page," accessed online from <http://www.dynamicdrive.com/forums/showthread.php?t=29014>, posts #3 & #4, Feb. 1 & 2, 2008, 5 pages.

Office Action, dated Apr. 23, 2012, U.S. Appl. No. 12/366,702, filed Feb. 6, 2009, In re Boegelund, 46 pages.

* cited by examiner

```
WEB PAGE ~122
<A href= "api1.pop.htm">
LEVEL 1</A>                 ~404
```

```
API1.POP.HTM ~124
<P><BR>
<IMG src="A.gif"
width="32" height="32"
border="0"></P>              ~416
LEVEL 1</BR><A
href="api2.pop.htm">
LEVEL 2</A>
```

```
<A href= "api1.pop.htm"> LEVEL 1</A>
```

```
<DIV id="lnk1div" onmouseover=show('pop1div') onmouseout=hide('pop1div')
style="position=absolute; left:10px; top:363px; width: 109px; height:18px; z-index:1;
visibility_visible"><img border="0" src="blanking.gif" width="109" height="18"></div>
<DIV id="pop1div" onmouseover="show('pop1div')" onmouseout="hide('pop1div')"
style="position: absolute; width:169px; border='1px groove black'; z-index:2;
background-color: 'white'; visibility: hidden"><P><BR><IMG src="A.gif" width="32"
height="32" border="0"></P>LEVEL 1</BR><A href="api2.pop.htm">LEVEL 2</
A></div>      ~418
```

```
API2.POP.HTM FILE ~126
<P><BR>
<IMG src="B.gif"
width="63" height="63"
border="0"></P>              ~426
LEVEL 2</BR>
<A href="api3.pop.htm">
LEVEL 3</A>
```

```
<DIV id="lnk1div" onmouseover=show('pop1div') onmouseout=hide('pop1div')
style="position=absolute; left:10px; top:363px; width: 109px; height:18px; z-index:1;
visibility_visible"><img border="0" src="blanking.gif" width="109" height="18"></div>
<DIV id="pop1div" onmouseover="show('pop1div')" onmouseout="hide('pop1div')"
style="position: absolute; width:169px; border='1px groove black'; z-index:2;
background-color: 'white'; visibility: hidden"><P><BR><IMG src="B.gif" width="63"
height="63" border="0"></P>LEVEL 2</BR><A href="api3.pop.htm">LEVEL 3</
A></div>      ~428
```

```
API3.POP.HTM FILE ~128
LEVEL 3<BR><A
href="api4.htm"> LEVEL
4</A><P><A                   ~436
href="D.pop.jpg"> <IMG
src="C.gif" width="32"
height="32" border="0"></
A>MOVE MOUSE OVER
</BR>
```

```
<DIV id="lnk1div" onmouseover=show('pop1div') onmouseout=hide('pop1div')
style="position=absolute; left:10px; top:363px; width: 109px; height:18px; z-index:1;
visibility_visible"><img border="0" src="blanking.gif" width="109" height="18"></div>
<DIV id="pop1div" onmouseover="show('pop1div')" onmouseout="hide('pop1div')"
style="position: absolute; width:169px; border='1px groove black'; z-index:2;
background-color: 'white'; visibility: hidden"><P><A
href="api4.htm">LEVEL 4</A><P><A href="D.pop.jpg"><IMG src="C.gif"
width="32" height="32" border="0"></A>MOVE MOUSE OVER</BR></div>
      ~438
```

LEVEL 1 ~402

| A ~412 |
|---|
| LEVEL 1 |
| LEVEL 2 ~414 |

~410

| B ~422 |  ~420 |
|---|---|
| LEVEL 2 | |
| LEVEL 3 ~424 | |

~430

| LEVEL 3 | |
|---|---|
| LEVEL 4 ~434 | |
| C | MOUSE ~432 |
|   | OVER |
| D ~442 | |

FIG. 7

CASCADING MENUS FOR REMOTE POPPING

CROSS REFERENCE TO RELATED APPLICATIONS

This application is a continuation of commonly assigned U.S. patent application Ser. No. 12/366,702, filled Feb. 6, 2009, which is hereby incorporated herein by reference.

BACKGROUND

1. Technical Field

This invention relates in general to the field of computing systems, and more particularly to a method, system, and computer program for rendering cascading menus constructed for remote popping.

2. Description of the Related Art

Networks, such as the Internet, may provide a system in which a user navigates between different network locations. In one example, the World Wide Web (WWW) provides a system in which a user navigates between text documents on different servers by means of hypertext links. Activating a hypertext link displayed on one webpage causes another page, also composed of text and links, to be delivered to the client computer.

A browser, which provides the client interface for displaying web pages and an interface through which a user interacts with web pages, may also record a history of the links a user accesses and provide "forward" or "back" options that allow a user to select a single option to move forward or backward to re-access web pages within the history of links. In addition, a browser may automatically open a new window to display the contents of the webpage accessed from a link selected by a user.

With the ever increasing number of websites now available, and the constantly changing information on each website, some browsers now provide a user with an option to move a pointer over a link, and without the user selecting to open the linked webpage, the browser places a preview image of the webpage accessed from the link in a small window, while the user maintains the pointer over the link. Thus, as a user moves a pointer throughout a webpage and passes over each link displayed within the webpage, the browser opens a small non-interactive preview window of the web pages at the different links.

While a preview window provides a user with a non-interactive preview within a first webpage of another webpage available at a particular link displayed within the first webpage, a preview window to a remote webpage is still limited in that the preview window is non-interactive, therefore the interactive elements of a webpage are not accessible from a preview window.

SUMMARY

In view of the foregoing, there is a need for a method, system, and program product for constructing interactive cascading menus for display within a webpage, where when a user selects a link to the webpage from a remote site, the cascading menus are also accessible from the remote site.

In one embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to search HTML code for a webpage with a plurality of links for a first link specified with a first target file name comprising a pop type element. The stored program instructions comprise program instructions, responsive to detecting the first link specified with the first target file name comprising the pop type element, to insert a first command into the HTML code to disable the first link and set an event to pop up a first menu layer of a plurality of layers of a cascading menu. The stored program instructions comprise program instructions to insert a second command into the HTML code to specify content of the first menu layer from a file accessed for the first target file name. The stored program instructions comprise program instructions, responsive to detecting the event, to trigger a browser to display the first menu layer with the specified content by the second command within an interface displaying the webpage.

In another embodiment, a computer program product comprises one or more computer-readable storage devices and program instructions, stored on at least one of the one or more storage devices. The stored program instructions comprise program instructions to search HTML code for a webpage with a plurality of links for a first link specified with a first target file name comprising a pop type element. The stored program instructions comprise program instructions, responsive to detecting the first link specified with the first target file name comprising the pop type element, to insert a first command into the HTML code to disable the first link and set an event to pop up a first menu layer of a plurality of layers of a cascading menu. The stored program instructions comprise program instructions to insert a second command into the HTML code to specify content of the first menu layer from a file accessed for the first target file name. The stored program instructions comprise program instructions to trigger a browser to display the first menu layer with the specified content by the second command within an interface displaying the webpage.

The pop reader recursively searches the file accessed for the first target file name to detect a second target file name comprising a pop type element. Responsive to detecting the second link specified with the second target file name comprising the pop type element, the pop reader inserts a next first command into the HTML code to disable the second link and set an event to pop up a second menu layer of a plurality of layers of a cascading menu and inserting a next second command to specify the content of the second menu layer from a second file accessed for the second target file name. Responsive to detecting the event, the browser triggers the second menu layer to pop up within the webpage with the specified content by the next second command.

To facilitate display of a cascading menu in the webpage, where the cascading menu is accessed from a remote site, the pop reader detects whether the first link is an autopop link from the presence of a pop type element in the first target file name.

To facilitate display of a cascading menu in the webpage, where the cascading menu is accessed from a remote site, a separate HTML file with a pop type element in the file name is constructed for each layer of the cascading menu for specifying the content of each layer of the cascading menu.

BRIEF DISCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

Figure 1:
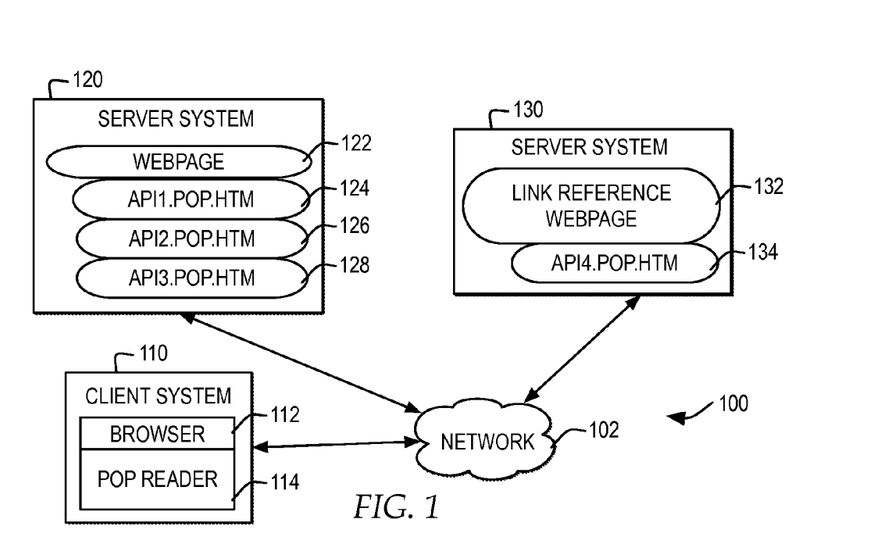
FIG. 1 is a block diagram depicting one embodiment of a network environment for accessing and displaying an interactive cascading menu in association with a first webpage, where the cascading menu can also be popped from a remote webpage linking to the first webpage.

Referring now to FIG. 1, a block diagram depicts one embodiment of a network environment for accessing and displaying an interactive cascading menu in association with a first webpage, where the cascading menu can also be popped from a remote webpage linking to the first webpage. In the example, in a distributed environment 100, a network 102 communicatively connects multiple systems, such as client system 110, server system 120, and server system 130. Network 102 may include, but is not limited to, packet-switching networks, such as the Internet or an intranet, and telephony networks, or other network communication mechanisms. In addition, network 102 may include routers, switches, gateways, and other hardware to enable a communication channel between client system 110, server system 120, and server system 130. Further, while in the example client system 110, server system 120, and server system 130 are depicted as communicating via network 102, in an alternate embodiment, one or more of the systems may be incorporated within network 102.

Figure 2:
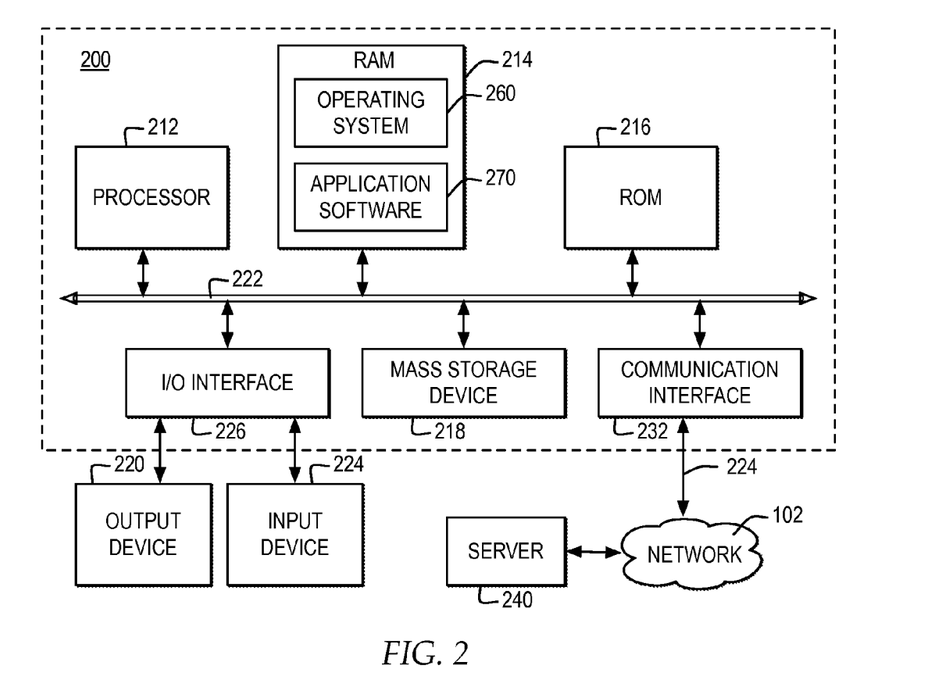
FIG. 2 is a block diagram illustrating an example of a computer system in which the invention may be implemented.

With reference now to FIG. 2, a block diagram illustrates an example of a computer system in which the invention may be implemented. Each of client system 110, server system 120, and server system 130 may implement one or more of the functional components described with reference to computer system 200 in FIG. 2. In addition, the invention may be executed in a variety of systems and combinations of systems, made up of functional components, such as the functional components described with reference to computer system 200 and may be communicatively connected to a network, such as network 102.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server, computer system 200 may include multiple processors designed to improve network servicing power. Where multiple processors share bus 222, additional controllers (not depicted) for managing bus access and locks may be implemented.

Processor 212 may be a general-purpose processor such as IBM's PowerPC (PowerPC is a registered trademark of International Business Machines Corporation) processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. In one embodiment, the operations performed by processor 212 may control management of content displayed on portable, content adjustable identification devices as depicted in the operations of flowchart of FIG. 7 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, such as mass storage device 218, a random access memory (RAM), such as RAM 214, a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in broadband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 200, partly on the user's computer, as a stand-alone software package, partly on the user's computer and partly on a remote computer or entirely on the remote computer or server, such as a server 240. In the latter scenario, the remote computer may be connected to the user's computer through any type of network, such as network 102, through a communication interface 232 over a network link 224, that may be connected, for example, to network 102 including a local area network (LAN) or a wide area network (WAN), or the connection may be made to an external computer (for example, through the Internet using an Internet Service Provider). Although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 224 and network 102 both use electrical, electromagnetic, or optical signals that carry digital data streams. The signals through the various networks and the signals on network link 224 and through communication interface 232, which carry the digital data to and from computer system 200, may be forms of carrier waves transporting the information.

In addition, computer system 200 may include multiple peripheral components that facilitate input and output within an interface. These peripheral components are connected to multiple controllers, adapters, and expansion slots, such as input/output (I/O) interface 226, coupled to one of the multiple levels of bus 222. For example, input device 224 may include, for example, a microphone, a video capture device, a body scanning system, a keyboard, a mouse, or other input peripheral device, communicatively enabled on bus 222 via I/O interface 226 controlling inputs. In addition, for example, an output device 220 communicatively enabled on bus 222 via I/O interface 226 for controlling outputs may include, for example, one or more graphical display devices, audio speakers, printers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Referring again to FIG. 1, in the example, client system 110 includes a browser 112 for accessing data from network locations accessed via network 102 and for controlling output of data from network locations accessed via network 102. For example, browser 112 may access and render a webpage. In one example of accessing and rendering a webpage, browser 112 accesses webpage 122 as delivered by server system 120 via network 102 and browser 112 controls rendering of webpage 122 within at least one interface of client system 110. In another example of accessing and rendering a webpage, browser 112 accesses a link reference webpage 132 as delivered by server system 130 via network 102 and controls display of link reference webpage 132 within an interface of client system 110. As will be further described with reference to FIG. 6, link reference webpage 132 may refer to a webpage which includes one or more selectable links to other network locations. In an alternate embodiment, client system 110 may include multiple browsers and additional applications for accessing and controlling output of data from network locations accessed via network 102.

In one example, webpage 122 and link reference webpage 132 each refer to at least one document consisting of at least one HyperText Markup Language (HTML) file and each refer to any related files for scripts, graphic files, audio files, links, and other elements. In addition, it will be understood that webpage 122 and link reference webpage 132 may refer to other types and formats of data transmittable via network 102. Moreover, it will be understood that a webpage, as used herein, may refer to documents and files that are distributed across multiple computing systems.

As browser 112 reads and renders the HTML file representing webpage 122, a pop reader 114 detects HTML code representing a cascading menu by detecting autopop links within the HTML code. In the example, a link is considered an autopop link if the target file name for the link contains a type element designated as an autopop type element. In one example, as described throughout, the type element of ".pop" in a target file name indicates the target file name includes an autopop element, therefore pop reader 114 will identify a link with a target file name containing ".pop" as an autopop link and enable browser 112 to pop a cascading menu in association with the link.

Pop reader 114 may be implemented in one or more layers of software and hardware available to client system 110 and may be integrated within browser 112, may be a plug-in to browser 112 or may be a stand-alone application.

For purposes of illustration, webpage 122 is depicted within server system 120 with the underlying .pop files for a cascading menu referenced as "api1.pop.htm" as referred to at reference numeral 124, "api2.pop.htm" as referred to at reference numeral 126, and "api3.pop.htm" as referred to at reference numeral 128.

Server system 120 delivers webpage 122 with the files "api1.pop.html", "api2.pop.html", "api3.pop.html", and "api4.pop.html" and pop reader 114 detects the references to these .pop type files within the HTML delivered with webpage 122. It will be understood that a webpage may include one or more .pop type files and that the .pop type files may be distributed across one or more systems within a distributed environment and may be associated with one or more webpages.

As pop reader 114 detects an autopop type element within the code for webpage 122 or within any of the .pop type files, pop reader 114 places additional code within the HTML code for webpage 122 to enable browser 112 to implement or "pop" a cascading menu within a webpage interface as specified by the .pop files. In particular, for each autopop element detected, pop reader 114 inserts commands into the HTML code for disabling an autopop link from performing like a normal link, for defining the menu style elements, and for defining the events to occur on a mouseover within the menu elements, to trigger and implement the next layer or submenu of a cascading menu with multiple layers. In one example, pop reader 114 may insert a <DIV> command within the HTML code using the 'insertAdjacentHTML' command, which when implemented provides a command insertion method for specifying, within a webpage, where to place a file and what file to place.

In one example to disable an autopop link from performing like a normal link, pop reader 114 inserts a <DIV> command which contains a transparent file for placement over the autopop link to prevent the autopop link from launching. In one example, the transparent file may include a transparent Graphics Interchange Format (GIF) file.

By browser 112 including pop reader 114 for detecting autopop files and inserting commands for implementing a cascading menu from the autopop files, the cascading menu specified by autopop files of a webpage may be shared across multiple webpages with minimal coding. In addition, a cascading menu specified by an autopop file on one website may link to a cascading menu on another website, such that all or portions of cascading menus originally referred in multiple websites may be linked together.

In the example, server system 130 includes a link reference webpage 132. In one example, link reference page 132 includes at least one link in reference to webpage 122, which when detected by pop reader 114, triggers rendering of the cascading menu specified by the files "api1.pop.htm" illustrated at reference numeral 124, "api2.pop.htm" illustrated at reference numeral 126, and "api3.pop.htm" illustrated at reference numeral 128, within an interface displaying link reference webpage 132. In another example, link reference page 132 may include an autopop link with a target file name of "api4.pop.htm" as illustrated at reference numeral 134. In one example, file "api4.pop.htm" as illustrated at reference numeral 134 may also include an autopop link with a target file name of "api2.pop.htm" illustrated at reference numeral 126, to specify a single cascading menu on link reference page 132 from "api4.pop.htm" illustrated at reference numeral 134, "api2.pop.htm" illustrated at reference numeral 126, and "api3.pop.htm" illustrated at reference numeral 128.

Within the HTML code for a webpage, such as webpage 122 or link reference webpage 132, the cascading menu for the webpage is publishable to search engines and other web tools by including a link to the cascading menu in the HTML code for the webpage. In one example, the cascading menu for webpage 122 is published through placement of a command such as "<DIV style="visibility:hidden"><A href="api1.pop.htm">Move the mouse over this text and a menu will pop up></A></div>." In this example, the link is invisible when webpage 122 is rendered by browser 112, from the "visibility:hidden" command, but the link is searchable by a search engine. A search engine will retrieve the target file name and the target link, publish the target link, and pop the cascading menu based on the file specified by the target file name, in a list of search results.

It is important to note that by browser 112 including pop reader 114 for detecting autopop files and inserting commands for generating a cascading menu from the autopop files, browser 112 renders cascading menus even when a Javascript setting for browser 112 is turned off or when pop-up blockers are set because the cascading menu is not dependent upon Javascript. Individuals or organizations may turn off the Javascripts in browser 112 for security.

In addition, it is important to note that by browser 112 including pop reader 114 for detecting autopop files and inserting commands for generating a cascading menu from the autopop files, browser 112 renders cascading menus as a native browser function, without requiring additional application programming.

It is important to note that by browser 112 including pop reader 114 for detecting autopop files and inserting commands for generating a cascading menu from the autopop files, browser 112 renders cascading menus that are not just pop up windows, but are an interactive, multiple level, multiple layer, cascading menu of windows.

Figure 3:
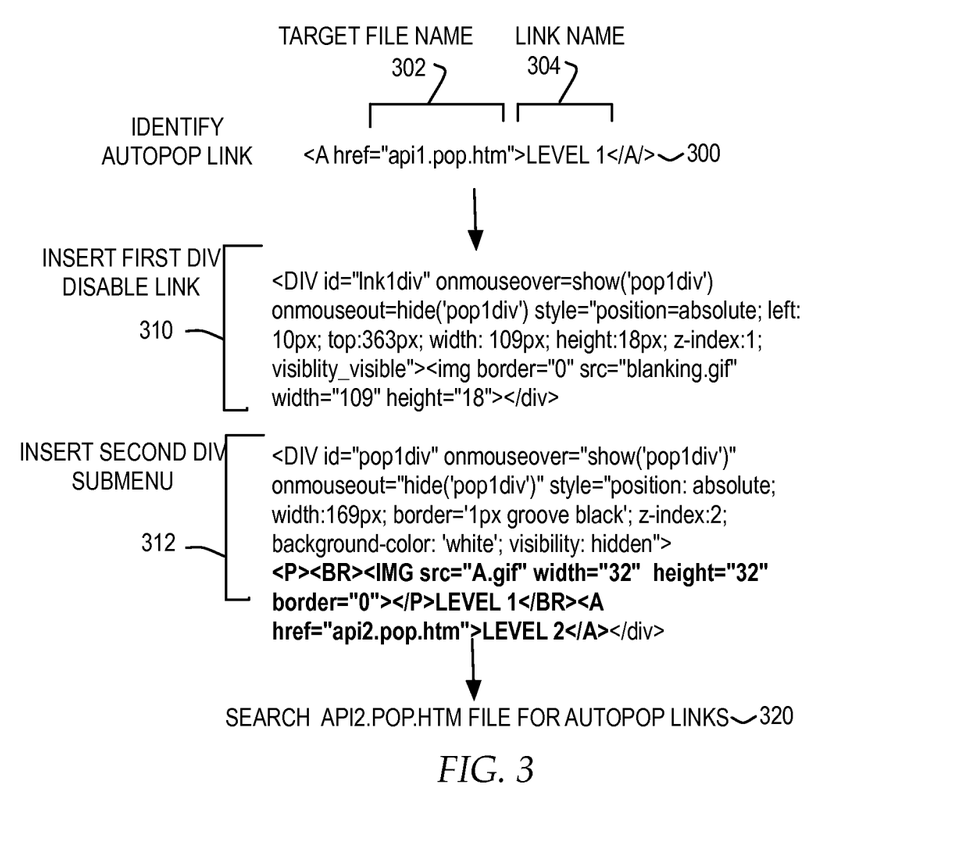
FIG. 3 is a block diagram depicting a pop reader identifying autopop links and implementing a cascading menu.

With reference now to FIG. 3 a block diagram illustrates a pop reader identifying autopop links and implementing a cascading menu from pop files referenced in the autopop links.

In the example, as illustrated at reference numeral 300, pop reader 114 identifies an autopop link because the HTML code for the webpage includes a target file name 302 referencing a .pop type of file "api1.pop.htm" for the link with link name "LEVEL1" as illustrated at reference numeral 304.

In response to identifying an autopop link, pop reader 114 inserts a first <DIV> command 310 into the HTML code. First <DIV> command 310 specifies a transparent GIF file for placement over the link, to effectively disable the link from normal operation. As illustrated in first <DIV> command 310, on mouse over of the link "LEVEL1", a "blanking gif" is placed over the link. In addition, first <DIV> command 310 specifies, for the "onmouseover" event, to pop up the second <DIV> by specifying "visibility: visible".

In addition, pop reader 114 inserts a second <DIV> command 312 into the HTML code as "invisible", which contains the content of the .pop target file and specifies the instructions for the submenu element itself that pops up and is displayed in association with a popup link. As illustrated in second <DIV> command 312, on a mouseover event, a menu is displayed with the displayable menu elements of the file "api1.pop.htm" referenced as "<P><BR><IMG src="A.gif" width="32" height="32" border="0"></P>LEVEL1</BR><A href="api2.pop.htm">LEVEL2</A>."

As illustrated at reference numeral 320, pop reader 114 next searches the "api2.pop.htm" file for autopop links. In particular, each submenu of a popup menu may include additional links and information. Pop reader 114 recursively searches each additional level of a submenu of a .pop file for additional links, determines which links are normal links and which links are autopop links and inserts first and second <DIV> commands for each autopop link.

Figure 4:
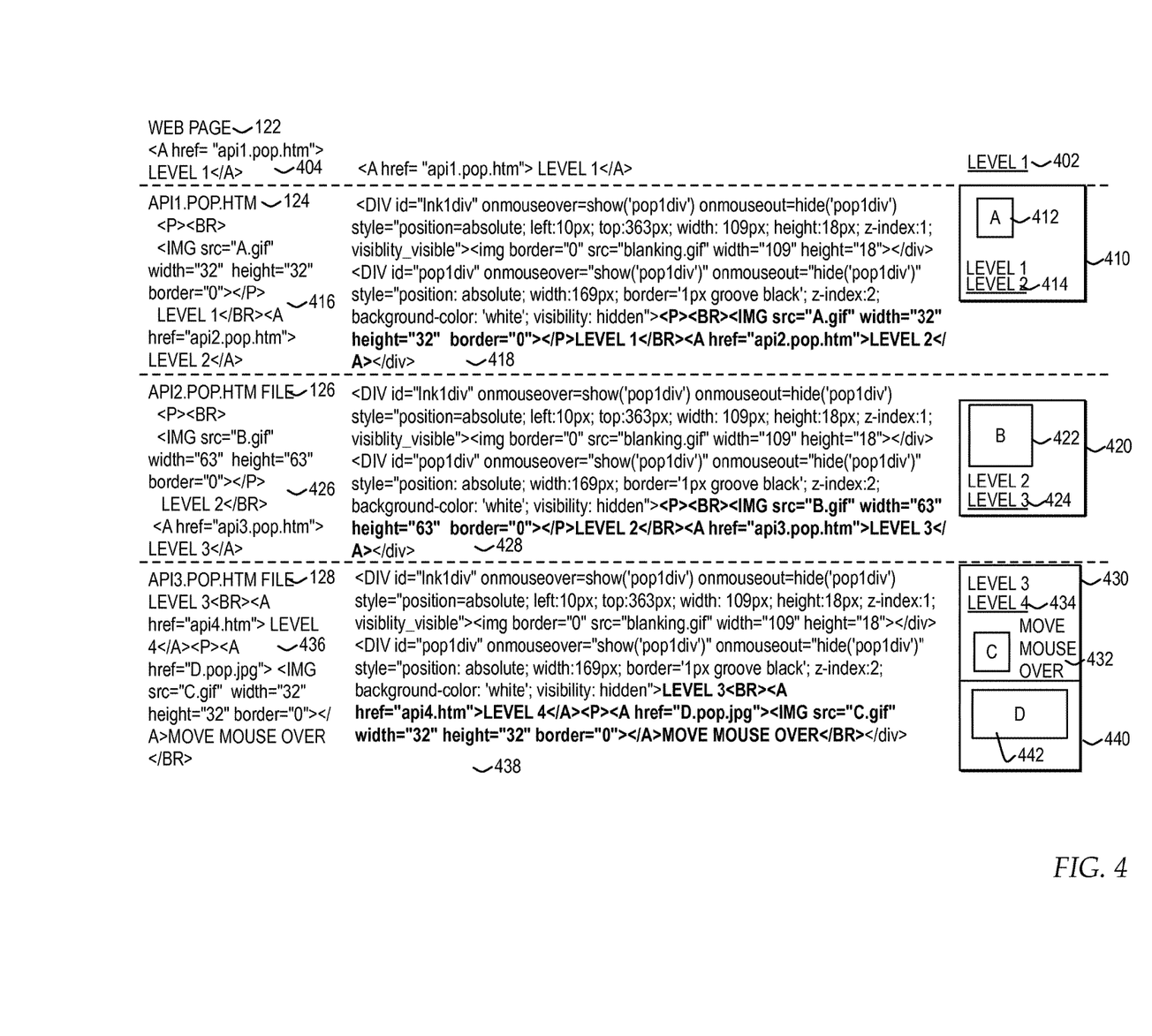
FIG. 4 is a block diagram illustrating one example of a browser implementing .pop type based files to render a cascading menu in a webpage interface.

With reference now to FIG. 4, a block diagram illustrates one example of a browser implementing .pop type based files to render a cascading menu in a webpage interface. For purposes of illustration, FIG. 4 illustrates examples of the type of HTML code within webpage 122 and pop type files 124, 126, and 128 referred to in FIG. 1. It will be understood that pop type files may include additional or alternate types of HTML code and other types of scripts. In addition, it is important to note that HTML code within pop type files may refer to cascading style sheets or styling scripts, for defining styles.

In the example, a portion of the HTML code for webpage 122 includes the link "<A href="api1.pop.htm">LEVEL1</A>" as illustrated at reference numeral 404. Pop reader 114 detects the target file name "api1.pop.htm" with the .pop reference for the link "LEVEL1" and triggers insertion of first and second <DIV> commands for disabling the link and specifying the displayable submenu, as illustrated at reference numeral 418. The example depicts HTML code illustrated at reference numeral 416 for the pop file named "api1.pop.htm" illustrated at reference numeral 124. Browser 112 renders the code for webpage 122 within an interface displaying webpage 122 as a selectable reference link "LEVEL1" as illustrated at reference numeral 402. In the example, an "<A href=>" instruction indicates the underlying target for a selectable reference link. In the example, selectable reference links are distinguished from other text within a display interface, by underlining.

As instructed by the first and second <DIV> commands illustrated at reference numeral 418, when a mouseover event over the link "LEVEL1" illustrated at reference numeral 402 is detected, browser 112 triggers display of the next layer of the cascading menu, or submenu, as illustrated at reference numeral 410. In the example, the HTML code in the file "api1.pop.htm" includes the instruction "<P><BR><IMG src="A.gif" width="32" height="32" border="0"></P>LEVEL1</BR><A href="api2.pop.htm">LEVEL2</A>". For purposes of illustration, the code "<IMG src="A.gif" width="32" height="32" border="0">", when rendered within a cascading menu element illustrated at reference numeral 410, includes the image "A.gif" sized "32" by "32", as illustrated at reference numeral 412. In addition, for the code "LEVEL1</BR><A href="api2.pop.htm">LEVEL2", within the cascading menu element illustrated at reference numeral 410, browser 112 renders the text "LEVEL1" and renders a selectable link for "LEVEL2", as illustrated at reference numeral 414.

Next, within the file named "api1.pop.htm", as illustrated at reference numeral 416, pop reader 114 detects the target file name "api2.pop.htm" with the .pop reference. Responsive to detecting the target file name with the .pop reference, pop reader 114 triggers insertion of first and second <DIV> commands for disabling the link and specifying the displayable submenu with the contents of the filed named "api2.pop.htm", as illustrated at reference numeral 428.

As instructed by the first and second <DIV> commands illustrated at reference numeral 428, when a mouseover event over the link "LEVEL2" illustrated at reference numeral 414 is detected, browser 112 triggers display of the next layer of the cascading menu, or submenu, illustrated at reference numeral 420. In the example, the HTML code in the file "api2.pop.htm" includes the instruction "<P><BR><IMG src="B.gif" width="63" height="63" border="0"></P>LEVEL2</BR><A href="api3.pop.htm">LEVEL3</A>" as illustrated at reference numeral 426. For purposes of illustration, the code "<IMG src="B.gif" width="63" height="63" border="0">", when rendered within the cascading menu element illustrated at reference numeral 420, includes the image "B.gif" sized "63" by "63", as illustrated at reference numeral 422. In addition, for the code "LEVEL2</BR><A href="api3.pop.htm">LEVEL3", within the cascading menu element illustrated at reference numeral 420, browser 112 renders the text "LEVEL2" and renders a selectable link for "LEVEL3", as illustrated at reference numeral 424.

Next, within the file named "api2.pop.htm", as illustrated at reference numeral 426, pop reader 114 detects the target file name "api3.pop.htm" with the .pop reference. Responsive to detecting the target file name with the .pop reference, pop reader 114 triggers insertion of first and second <DIV> commands for disabling the link and specifying the displayable submenu with the contents of the filed named "api3.pop.htm", as illustrated at reference numeral 438.

As instructed by the first and second <DIV> commands illustrated at reference numeral 428, when a mouseover event over the link "LEVEL3" illustrated at reference numeral 424 is detected, browser 112 triggers display of the next layer of the cascading menu, or submenu, illustrated at reference numeral 430. In the example, the HTML code in the file "api3.pop.htm" includes the instruction "LEVEL3<BR><A href="api4.htm">LEVEL4</A><P><A href="D.pop.jpg"><IMG src="C.gif" width="32" height="32" border="0"></A>MOVE MOUSE OVER</BR>" as illustrated at reference numeral 436. For purposes illustration, the code "LEVEL3<BR><A href="api4.htm">LEVEL4" is rendered within the cascading menu element illustrated at reference numeral 430, as the text "LEVEL3" and the selectable normal link "LEVEL 4", as illustrated at reference numeral 434. In addition, the code "<A href="D.pop.jpg"><IMG src="C.gif" width="32" height="32" border="0"></A>MOVE MOUSE OVER</BR>" illustrated at reference numeral 432 is rendered within the cascading menu element illustrated at reference numeral 430 including the image for "C.gif" at reference numeral 432 sized "32" by "32" and the text "MOVE MOUSE OVER".

The target file name for the image "C.gif" in the HTML code illustrated at reference numeral 438 is "D.pop.jpg". The cascading menu element illustrated at reference numeral 440 illustrates a rendering of the graphical element "D.pop.jpg" at reference numeral 442 when a mouseover event over the "C.gif" image illustrated at reference numeral 432 is detected.

Figure 5:
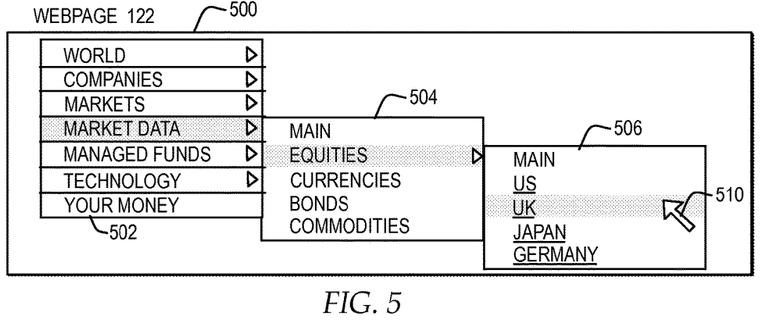
FIG. 5 is a block diagram depicting an example of a rendered webpage displaying a cascading menu.

With reference now to FIG. 5, a block diagram illustrates an example of a rendered webpage displaying a cascading menu. In the example, a browser interface 500 renders webpage 122, including a cascading menu including portions displayed by a first menu 502, a second menu 504, and a third menu 506. In the example, the cascading menu, as initiated with first menu 502, may be automatically triggered to pop up through placement of the command <div onclick="top.location.href='api1.pop.htm';"> in the HTML code of webpage 122. Pop reader 114 will detect the target file name for the link including a .pop reference, and retrieve the contents of the file "api1.pop.htm" as illustrated at reference numeral 124 for rendering first menu 502.

The file "api1.pop.htm" for specifying first menu 502, in the example depicted, will have a target file name for the link of a .pop file that defines second menu 504, such as "api2.pop.html" illustrated at reference numeral 126 and the .pop file that defines second menu 504 will have a target file name for the link of a .pop file that defines third menu 506, such as "api3.pop.html" illustrated at reference numeral 128. As previously described, pop reader 114 inserts first and second <DIV> commands into the .pop files to instruct browser 112 to render the .pop files as a cascading menu responsive to mouse over events.

As illustrated, the user places cursor 510 within browser interface 500, mouseover events may be triggered as the user places cursor 510 over areas defined to be triggered when a cursor is placed over the area. In the example, as illustrated by the shaded reference areas, in first menu 502, the user has positioned cursor 510 over "market data", which triggers second menu 504. The user has positioned cursor 510 over "equities" in second menu 504, which triggers third menu 506. Within third menu 506, "US", "UK", "JAPAN", and "GERMANY" are underlined links, representative of normal links, where cursor 510 is placed over the link "UK".

Figure 6:
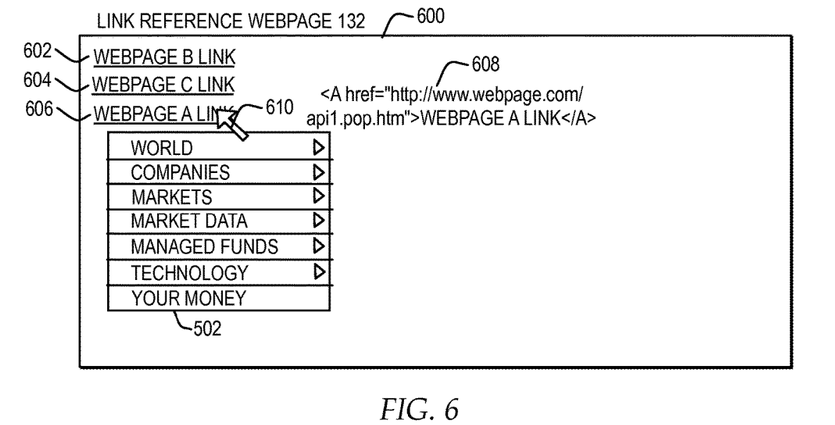
FIG. 6 is a block diagram illustrating an example of a webpage with a link referencing a remote cascading menu.

Referring now to FIG. 6, a block diagram illustrates an example of a webpage with a link referencing a remote cascading menu. In the example, browser interface 600 renders link reference webpage 132, including a cascading menu including portions displayed by a first menu 502. The rendering of link reference webpage 132 includes multiple links, as illustrated by "webpage B link" at reference numeral 602, "webpage C link" at reference numeral 604, and "webpage A link" at reference numeral 606.

In the example pop reader 114 scans the HTML code for link reference webpage 132 and identified "webpage B link" at reference numeral 602 and "webpage C link" at reference numeral 604 as normal links.

For purposes of example, the HTML code within link reference webpage 132 is illustrated at reference numeral 608, with the instruction "<A href="http://www.webpage.com/api1.pop.htm"> WEBPAGE A LINK</A>". In the example, pop reader 114 identifies "webpage A link" at reference numeral 606 as an autopop link because the target link file for "webpage A" is a .pop file. Pop reader 114 inserts first and second <DIV> commands into the HTML code for webpage 132 to inactivate "webpage A link" at reference numeral 606 and to trigger first menu 502 as specified in the file "api1.pop.htm", upon mouseover of cursor 610 over "webpage A link" at reference numeral 606.

In the example, it is important to note that link reference webpage 132 includes an autopop link with a target link file remotely accessed from webpage 122 through "api1.pop.htm" at reference numeral 124. By enabling remote access of the cascading menu for webpage 122, by link reference webpage, through access to efficient .pop HTML files and code management by pop reader 114, cascading menus are remotely accessible and shareable across multiple websites without using Javascript or other complex scripts.

Figure 7:
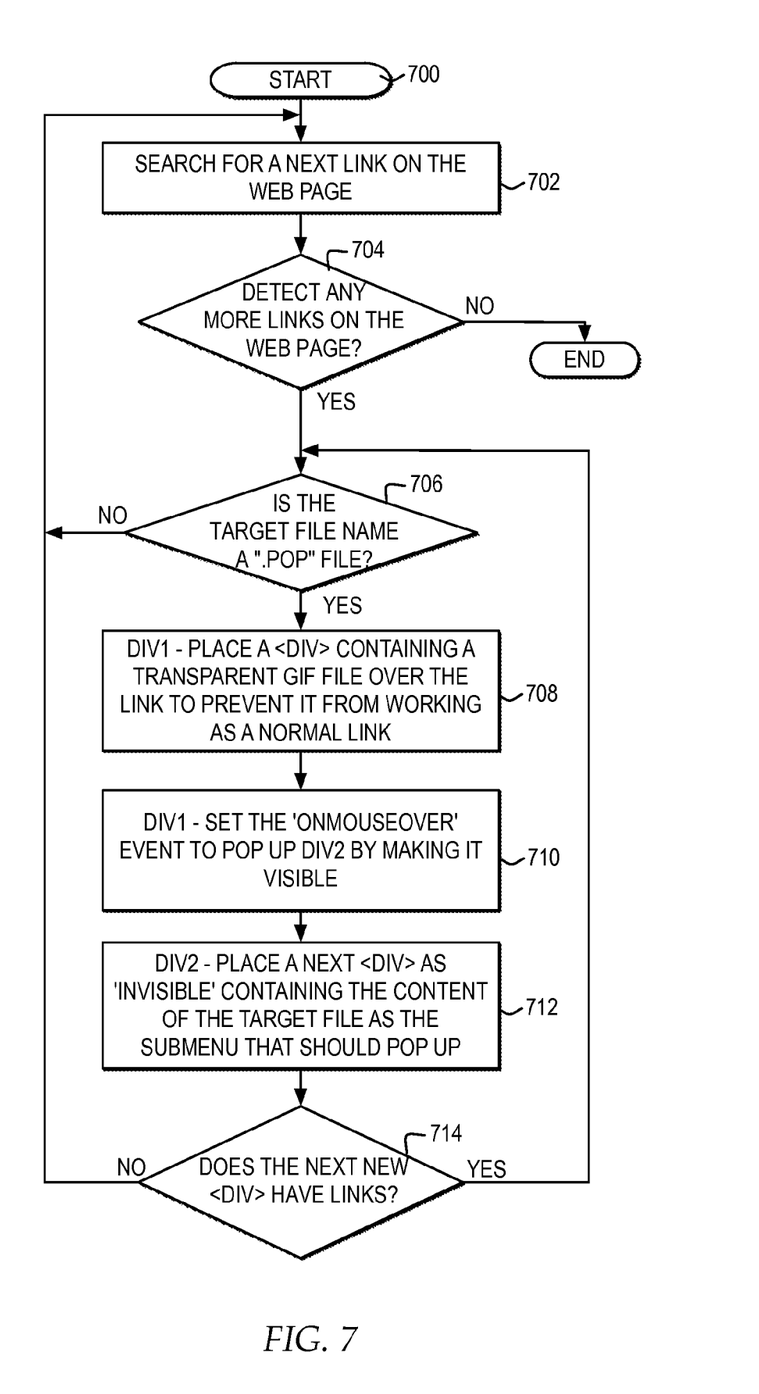
FIG. 7 is the high level logic flowchart depicting a process and program for rendering a cascading menu in association with an autopop link.

With reference now to FIG. 7, the high level logic flowchart depicts a process and program for rendering a cascading menu in association with an autopop link. In the example, the process starts at block 700 and thereafter proceeds to block 702. Block 702 illustrates searching for a next link on a webpage.

Next, block 704 depicts a determination whether any more links are detected on the webpage. If no additional links are detected on the webpage, then the process ends. If a link is detected on the webpage, then the process passes to block 706.

Block 706 illustrates a determination whether the target file name for the link is a .pop file. If the target file name for the link is not a .pop file, then the process returns to block 702. If the target file name for the link is a .pop file, then the process passes to block 708.

Block 708 illustrates for the first DIV, placing a first <DIV> command containing a transparent gif file over the link in the webpage to prevent it from working as a normal link. Next, block 710 depicts for the first DIV, setting the "onmouseover" event to pop up the second DIV by making it visible. Thereafter, block 712 depicts for the second DIV, placing a next <DIV> as "invisible" containing the content of the target .pop file as the submenu that should pop up.

Next, block 714 depicts a determination whether the next <DIV> has links. If the next <DIV> does not have links, then the process returns to block 702. If the next <DIV> does have links, then the process returns to block 706.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
    program instructions to search HTML code for a webpage with a plurality of links for a first link specified with a first target file name comprising a pop type element;
    program instructions, responsive to detecting the first link specified with the first target file name comprising the pop type element, to insert a first command into the HTML code to disable the first link and set a first event to pop up a first menu layer of a plurality of layers of a cascading menu;
    program instructions to insert a second command into the HTML code to specify content of the first menu layer from a file accessed for the first target file name;
    program instructions to access the file specified by the first target file, the file being associated with a remote webpage separate from the webpage;
    program instructions to search the file accessed for the first target file name for a second link specified with a second target file name comprising the pop type element;
    program instructions, responsive to detecting the second link specified with the second target file name comprising the pop type element, to insert a next first command into the HTML code to disable the second link and set a second event to pop up a second menu layer of a plurality of layers of a cascading menu;
    program instructions to insert a next second command to specify content of the second menu layer from a second file accessed for the second target file name;
    program instructions to access the second file specified by the second target file, the second file associated with the webpage, wherein the cascading menu combines the first menu layer hosted by a remote webpage with the second menu layer hosted by the webpage
    program instructions, responsive to detecting the first event, to trigger a browser to display the first menu layer with the specified content by the second command within an interface displaying the webpage; and
    program instructions, responsive to detecting the second event, to trigger the second menu layer to pop up within the webpage with the specified content of the second menu layer by the next second command.

2. The computer system according to claim 1, the stored program instructions further comprising:
    program instructions to classify the first link as an autopop link based on the presence of the pop type element comprising pop in the first target file name; and
    program instructions to access the file specified by the first target file name, the file being associated with a remote webpage separate from the webpage.

3. The computer system according to claim 1, the stored program instructions further comprising:
    program instructions to construct a plurality of HTML based files for defining the cascading menu, wherein each of said plurality of HTML based files specifies a separate layer of the cascading menu.

4. The computer system according to claim 1, wherein the program instructions to insert a first command into the HTML code to disable the first link and set an event to pop up a first menu layer of a plurality of layers of a cascading menu comprise:
    program instructions to set the event to occur in response to a positioning of a cursor over the first link as displayed within the webpage.

5. The computer system according to claim 1, wherein the program instructions to insert a first command into the HTML code to disable the first link and set an event to pop up a first menu layer of a plurality of layers of a cascading menu comprise:
    program instructions to set the event to occur automatically as the browser renders the webpage within the interface.

6. The computer system according to claim 1, the stored program instructions further comprising:
    program instructions, responsive to detecting a mouse over event over the first link when the first browser displays the first link as a visible search result in a separate webpage, to trigger the browser to display the first menu layer with the specified content of the first menu layer by the second command within the separate webpage.

7. The computer system according to claim 1, wherein the program instructions to insert the first command into the HTML code to disable the first link and set the event to pop up the first menu layer of the plurality of layers of the cascading menu;
    program instructions to insert the second command into the HTML code to specify the content of the first menu layer from the file accessed for the first target file name, comprise:
    program instructions to insert the first command into the HTML code to disable the first link by inserting a first DIV command with a transparent file for placement over the first link to prevent the link from launching;
    program instructions to insert the first command into the HTML code to set the event to pop up the first menu layer of the plurality of layers of the cascading menu by inserting the first DIV command setting a mouse over event to trigger the second command by setting the second command to visible; and
    program instructions to insert the second command into the HTML code to specify the content of the first menu layer from the file accessed for the first target file name by placing a second DIV command set to invisible with the content of the file set as the first menu layer.

8. The computer system of claim 1, wherein the program instructions, responsive to detecting the event, to trigger a browser to display the first menu layer with the specified content of the first menu layer by the second command within an interface displaying the webpage, comprise:

program instructions, responsive to detecting the event, to trigger the browser to display the first menu layer specified with the specified content of the first menu layer by the second command comprising a graphic image.

9. The computer system of claim 1, the stored program instructions further comprising:
program instructions, responsive to detecting the event, to trigger the browser to display the first menu layer with the specified content of the first menu layer by the second command within the interface displaying the webpage while a Javascript setting for activating Javascript for the browser is turned off.

10. The computer system of claim 1, the stored program instructions further comprising:
program instructions, responsive to detecting the event, to trigger the browser to display the first menu layer with the specified content of the first menu layer by the second command within the interface displaying the webpage while a pop-up window blocker is set to block any pop-up windows from being displayed within the browser.

11. A computer program product comprising one or more non-transitory computer-readable storage devices and program instructions, stored on at least one of the one or more storage devices, the stored program instructions comprising:
program instructions to search HTML code for a webpage with a plurality of links for a first link specified with a first target file name comprising a pop type element;
program instructions, responsive to detecting the first link specified with the first target file name comprising the pop type element, to insert a first command into the HTML code to disable the first link and set a first event to pop up a first menu layer of a plurality of layers of a cascading menu;
program instructions to insert a second command into the HTML code to specify content of the first menu layer from a file accessed for the first target file name;
program instructions to access the file specified by the first target file, the file being associated with a remote webpage separate from the webpage;
program instructions to search the file accessed for the first target file name for a second link specified with a second target file name comprising the pop type element;
program instructions, responsive to detecting the second link specified with the second target file name comprising the pop type element, to insert a next first command into the HTML code to disable the second link and set a second event to pop up a second menu layer of a plurality of layers of a cascading menu;
program instructions to insert a next second command to specify content of the second menu layer from a second file accessed for the second target file name;
program instructions to access the second file specified by the second target file, the second file associated with the webpage, wherein the cascading menu combines the first menu layer hosted by a remote webpage with the second menu layer hosted by the webpage;
program instructions, responsive to detecting the first event, to trigger a browser to display the first menu layer with the specified content by the second command within an interface displaying the webpage; and
program instructions, responsive to detecting the second event, to trigger the second menu layer to pop up within the webpage with the specified content of the second menu layer by the next second command.

12. The computer program product according to claim 11, the stored program instructions further comprising:
program instructions to classify the first link as an autopop link based on the presence of the pop type element comprising pop in the first target file name; and
program instructions to access the file specified by the first target file name, the file being associated with a remote webpage separate from the webpage.

13. The computer program product according to claim 11, the stored program instructions further comprising:
program instructions to construct a plurality of HTML based files for defining the cascading menu, wherein each of said plurality of HTML based files specifies a separate layer of the cascading menu.

14. The computer program product according to claim 11, wherein the program instructions to insert a first command into the HTML code to disable the first link and set an event to pop up a first menu layer of a plurality of layers of a cascading menu comprise:
program instructions to set the event to occur in response to a positioning of a cursor over the first link as displayed within the webpage.

15. The computer program product according to claim 11, wherein the program instructions to insert a first command into the HTML code to disable the first link and set an event to pop up a first menu layer of a plurality of layers of a cascading menu comprise:
program instructions to set the event to occur automatically as the browser renders the webpage within the interface.

* * * * *